US007697876B2

(12) United States Patent
Nakatsu

(10) Patent No.: US 7,697,876 B2
(45) Date of Patent: Apr. 13, 2010

(54) IMAGE FORMING APPARATUS AND CONTROL METHOD FOR REGISTRATION MARK DETECTION

(75) Inventor: Haruhiko Nakatsu, Moriya (JP)

(73) Assignee: Canon Kabushiki Kaisha (JP)

( * ) Notice: Subject to any disclaimer, the term of this patent is extended or adjusted under 35 U.S.C. 154(b) by 246 days.

(21) Appl. No.: 11/857,509

(22) Filed: Sep. 19, 2007

(65) Prior Publication Data

US 2008/0069603 A1 Mar. 20, 2008

(30) Foreign Application Priority Data

Sep. 19, 2006 (JP) ............................ 2006-253205

(51) Int. Cl.
*G03G 15/01* (2006.01)
*B41J 2/385* (2006.01)
*G01D 15/06* (2006.01)

(52) U.S. Cl. ...................................... 399/301; 347/116

(58) Field of Classification Search ................. 399/299, 399/301, 302; 347/116
See application file for complete search history.

(56) References Cited

U.S. PATENT DOCUMENTS 5,946,537 A * 8/1999 Nakayasu et al. ........... 399/301
6,404,450 B1 * 6/2002 Fukaya ........................ 347/116
6,603,495 B2 * 8/2003 Hayakawa .................. 347/116
6,687,472 B2 * 2/2004 Udaka et al. ............ 347/116 X
6,693,654 B2 * 2/2004 Shinohara ................... 347/116
6,711,364 B2 * 3/2004 Shinohara ............... 347/116 X
7,389,075 B2 * 6/2008 Takahashi et al. ........... 399/301

FOREIGN PATENT DOCUMENTS

JP 63-271275 A 11/1988
JP 11-184348 A 7/1999
JP 2000-137367 A 5/2000
JP 2003-066677 A 3/2003
JP 2004-69909 A 3/2004
JP 2004-85954 A 3/2004
JP 2004-325608 A 11/2004

* cited by examiner

*Primary Examiner*—Sandra L Brase
(74) *Attorney, Agent, or Firm*—Rossi, Kimms & McDowell LLP

(57) ABSTRACT

An image forming apparatus includes a first registration mark detection unit, second registration mark detection unit, CPU, and first registration mark time difference storage. If the width (tp) of the first registration mark signal detected by the second registration mark detection unit is equal to or smaller than a set value, the CPU directly uses, as an enable signal for controlling paper conveyance, the first registration mark detection signal detected by the first registration mark detection unit. If the width (tp') of the first registration mark signal detected by the second registration mark detection unit is equal to or larger than a set value, the CPU controls a paper conveyer by setting, as a correct first registration mark position, a position shifted by tE measured from an error signal, from the first registration mark detection signal detected by the first registration mark detection unit.

7 Claims, 15 Drawing Sheets

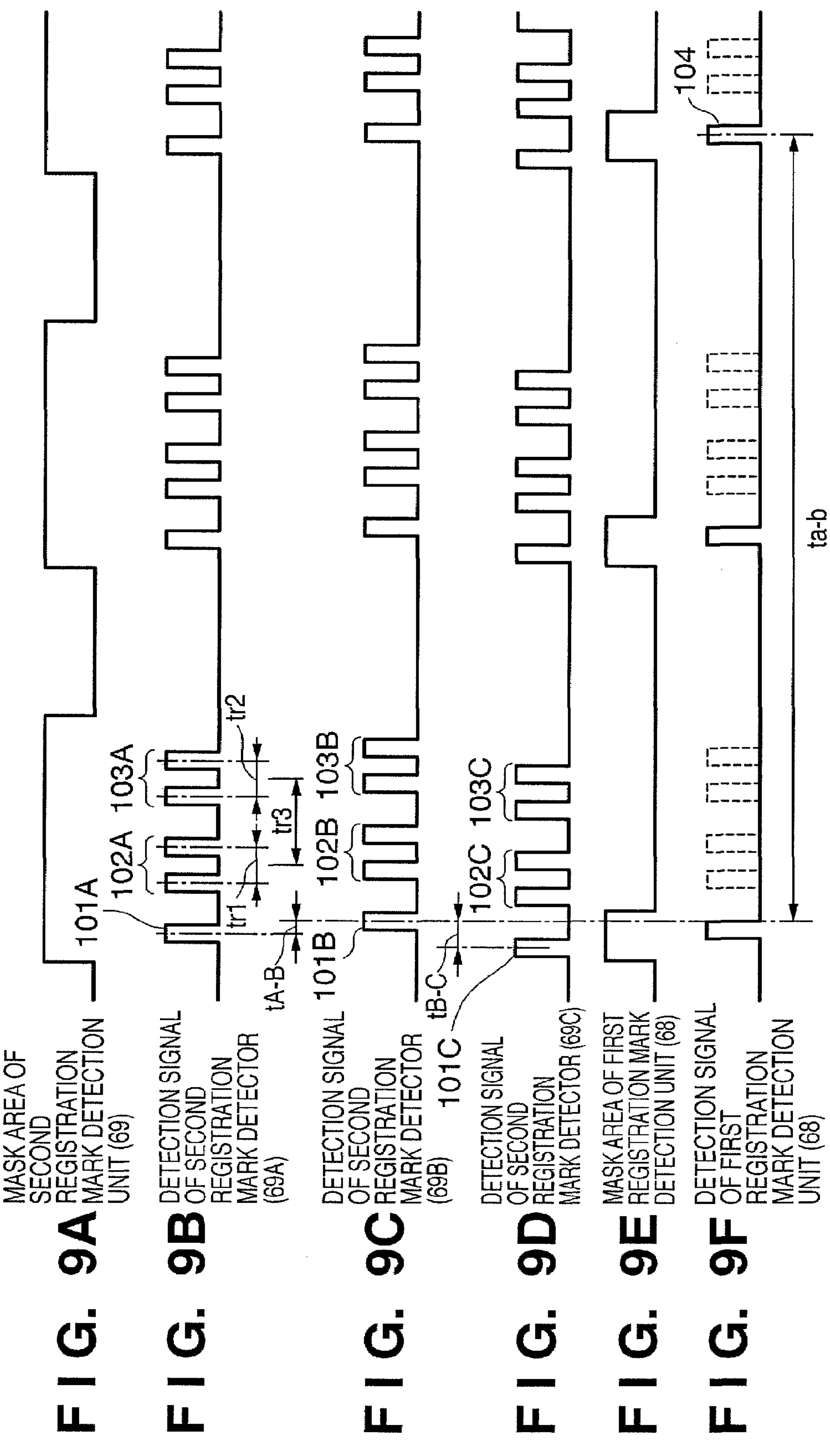

FIG. 9A MASK AREA OF SECOND REGISTRATION MARK DETECTION UNIT (69)

FIG. 9B DETECTION SIGNAL OF SECOND REGISTRATION MARK DETECTOR (69A)

FIG. 9C DETECTION SIGNAL OF SECOND REGISTRATION MARK DETECTOR (69B)

FIG. 9D DETECTION SIGNAL OF SECOND REGISTRATION MARK DETECTOR (69C)

FIG. 9E MASK AREA OF FIRST REGISTRATION MARK DETECTION UNIT (68)

FIG. 9F DETECTION SIGNAL OF FIRST REGISTRATION MARK DETECTION UNIT (68)

DETECTION SIGNAL OF SECOND REGISTRATION MARK DETECTOR (69A)

DETECTION SIGNAL OF SECOND REGISTRATION MARK DETECTOR (69B)

DETECTION SIGNAL OF SECOND REGISTRATION MARK DETECTOR (69C)

IMAGE FORMING APPARATUS AND CONTROL METHOD FOR REGISTRATION MARK DETECTION

BACKGROUND OF THE INVENTION

1. Field of the Invention

The present invention relates to an image forming apparatus which forms an image by electrostatic printing, electrophotographic printing, or the like and, more particularly, to an image forming apparatus having an intermediate transfer member and a control method.

2. Description of the Related Art

Some conventional image forming apparatuses such as a laser beam printer and digital copying machine form a full-color image by developing electrostatic latent images formed on image carriers (photosensitive drums serving as photosensitive members) with developers (toners) and superposing the developed images (toner images) on an intermediate transfer member or paper, like a full-color image forming apparatus. An image forming apparatus of this type suffers color misregistration. The color misregistration is an image error caused by the geometrical characteristics (e.g., differences in the slope of the scan line in the main scanning direction and the curvature of the scan line) of beams scanned by a plurality of optical scanning mechanisms.

To solve this problem, there has been proposed an image forming apparatus having an adjustment unit which controls to make the geometrical characteristics of scan beams coincide with each other (see Japanese Patent Laid-Open No. 63-271275).

If a scratch or the like exists on an intermediate transfer member (intermediate transfer belt serving as an intermediate transfer member) which receives a toner image formed on the image carrier of the image forming apparatus, a registration mark for checking the amount of color misregistration may not be accurately read when transferred as a toner image. In this case, an amount of color misregistration different from an actual one is detected. As a result, color misregistration cannot be corrected at high precision and may worsen. To solve this problem, there has been proposed a technique of detecting a noise component generated by a scratch or the like on the intermediate transfer belt of an image forming apparatus, and forming a registration mark at a portion other than the noise-generated portion (see Japanese Patent Laid-Open No. 2000-137367).

Another technique has also been proposed (see Japanese Patent Laid-Open No. 2004-325608). In this proposal, a plurality of registration marks are formed on the intermediate transfer belt of an image forming apparatus. The image forming apparatus comprises an abnormality determination unit which determines a registration mark detection abnormality. Color misregistration is corrected on based on detection signals except for a registration mark detection signal determined to be abnormal by the abnormality determination unit.

An image forming apparatus having an intermediate transfer belt or photosensitive belt transfers an image at a predetermined position on paper in the following manner. That is, the timing when the paper conveyance roller conveys paper to a transfer position is determined based on the timing when the optical scanning mechanism starts exposure based on an image signal. Based on the determined timing, an image is transferred from the intermediate transfer belt or photosensitive belt to a predetermined position on paper.

However, this transfer method causes image misregistration until the toner image is transferred onto paper from a position where a toner image is primarily transferred onto the intermediate transfer belt or a position where the photosensitive belt is exposed. The image misregistration occurs owing to variations in belt speed, or a slip between the belt and the belt driving roller.

To solve this problem, the following technique has been proposed (see Japanese Patent Laid-Open No. 11-184348). In this proposal, a registration mark indicating an image position is formed on the photosensitive belt of an image forming apparatus. A detection means for detecting a registration mark is arranged upstream of the transfer position. A paper detection sensor for detecting the leading end of paper is also arranged. By comparing detection timings, misregistration of an image transferred onto paper is detected.

FIG. 14 is a block diagram showing the schematic arrangement of the main part of a conventional image forming apparatus.

In FIG. 14, an image signal output unit 1001 corresponds to an image reading apparatus such as a scanner or an external terminal such as a personal computer. The image signal output unit 1001 outputs an image signal. A mark signal output unit 1002 outputs a mark signal upon reading a registration mark formed on a photosensitive belt 1005 of the image forming apparatus. A sync signal generation unit 1013 outputs an exposure sync signal to the image signal output unit 1001 and mark signal output unit 1002 in synchronism with the image forming timing. Upon receiving the exposure sync signal, the image signal output unit 1001 and mark signal output unit 1002 respectively output an image signal and mark signal to a synthesis unit 1003.

The synthesis unit 1003 synthesizes the received image signal and mark signal, and outputs the synthesized signal to an exposure unit 1004. The exposure unit 1004 modulates the receive signal into a laser driving signal, and irradiates the photosensitive belt 1005 with a laser beam. A mark detection sensor 1008 and paper detection sensor 1009 are arranged near the transfer position of paper P. An image misregistration prediction unit 1012 compares a signal obtained by reading, by the mark detection sensor 1008, the registration mark formed on the photosensitive belt 1005 with a signal obtained by reading the leading end of the paper P by the paper detection sensor 1009. Based on the detection by the sensors 1008 and 1009, the image misregistration prediction unit 1012 can detect an error caused by rotational variations of a photosensitive belt driving roller 1006 or the like.

The following problem arises in the technique of positioning and transferring an image onto paper in the conventional image forming apparatus. A toner image forms a registration mark for detecting the amount of misregistration (so-called color misregistration) between images formed by a plurality of image forming units, similar to a registration mark for determining an image transfer position on paper.

However, the registration mark formed on the photosensitive belt or intermediate transfer belt of the image forming apparatus may not be accurately detected owing to a scratch or the like present on the belt. If the registration mark overlaps the scratch on the belt, the registration mark detection time becomes longer. This results in a failure in accurately detecting a registration mark at the leading end (uppermost-stream registration mark among registration marks formed on the belt in the conveyance direction). When paper conveyance is controlled based on detection of the registration mark at the leading end, the distance from the leading end of paper to the leading end of an image formed on paper varies. In an arrangement in which a detection means is provided upstream of the transfer position to detect a registration mark serving as a reference for controlling paper conveyance, like Japanese Patent Laid-Open No. 11-184348, if the photosensitive belt or intermediate transfer belt is scratched, the detection error increases.

A plurality of registration marks can also be formed on the photosensitive belt or intermediate transfer belt of the image forming apparatus in order to detect the amount of color misregistration. In this case, the registration marks are formed at intact portions on the belt. Alternatively, if the error detection unit detects an error in registration mark detection, the registration mark may not be employed as color misregistration information.

A formed registration mark is paired with an image to determine an image transfer position on paper. The image forming apparatus forms images at predetermined intervals. It is, therefore, very difficult to form a plurality of registration marks for detecting the amount of color misregistration as described above. In addition, the image transfer position may greatly change when the image transfer position on paper is determined directly using a registration mark detection signal.

SUMMARY OF THE INVENTION

The present invention enables to detect the first reference mark at high precision and form an image at high precision even when a scratch or the like exists on an intermediate transfer member.

According to one aspect of the present invention, the foregoing problem is solved by providing an image forming apparatus comprising an intermediate transfer member adapted to be able to form a color image by superposing and transferring images formed on image carriers, a secondary transfer unit adapted to transfer, onto a printing medium, the color image formed on the intermediate transfer member, a first detection unit adapted to be arranged at a first position and face the intermediate transfer member, a second detection unit adapted to be arranged at a second position upstream of the first position in a conveyance direction of the intermediate transfer member and face the intermediate transfer member, a determination unit adapted to determine whether a result of detecting, by the second detection unit, a first reference image formed on the intermediate transfer member is not larger than a predetermined value and a control unit adapted to, when the determination unit determines that the result of detecting the first reference image is not larger than the predetermined value, control conveyance of the printing medium to the secondary transfer unit on the basis of the first reference image detected by the first detection unit, and when the determination unit determines that the result of detecting the first reference image is larger than the predetermined value, control conveyance of the printing medium to the secondary transfer unit on the basis of the first reference image detected by the second detection unit.

According to another aspect of the present invention, the foregoing problem is solved by providing a method of controlling an image forming apparatus which transfers, onto an intermediate transfer member, a visible image formed on an image carrier and transfers, onto a printing medium, the image on the intermediate transfer member, the method comprises detecting a plurality of first reference marks which are formed in a direction perpendicular to a conveyance direction of the intermediate transfer member in order to determine a transfer position of the image on the printing medium, allowing to detect a second reference mark which is formed downstream of positions where the first reference marks are formed on the intermediate transfer member, in order to detect a misregistration amount of the image transferred onto the intermediate transfer member, and also detecting the first reference marks, determining whether detection signals of the first reference marks detected in the step of allowing to detect a second reference mark are not larger than a predetermined value and when the detection signals of the first reference marks are determined in the determining step to be not larger than the predetermined value, controlling conveyance of the printing medium by using the detection signals of the first reference marks detected in the step of detecting a plurality of first reference marks, and when the detection signals of the first reference marks are determined to be larger than the predetermined value, controlling conveyance of the printing medium on the basis of positions of the first reference marks that are obtained by calculation.

Further features of the present invention will be apparent from the following description of exemplary embodiments with reference to the attached drawings.

BRIEF DESCRIPTION OF THE DRAWINGS

FIG. 5B is a view showing a horizontal margin error.

FIGS. 9A to 9F are timing charts showing registration mark detection signals;

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
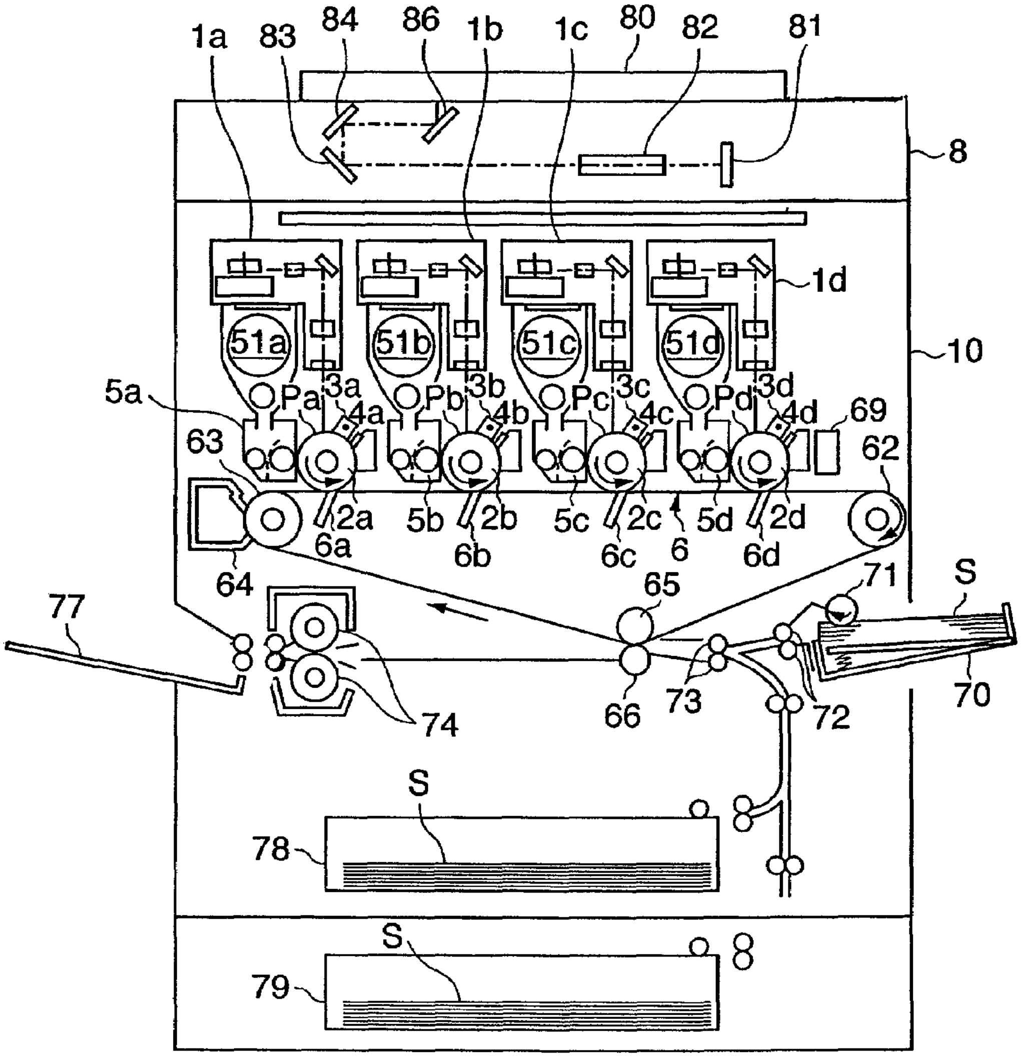
FIG. 1 is a sectional view showing the structure of an image forming apparatus according to an embodiment of the present invention.

FIG. 1 is a sectional view showing the structure of an image forming apparatus according to the embodiment of the present invention.

In FIG. 1, the image forming apparatus is configured as a digital full-color copying apparatus having a document reading section 8 which reads a document image, an image forming section 10 which forms a full-color image on paper, a manual paper feed cassette 70, paper feed cassettes 78 and 79, and the like.

The document reading section 8 comprises mirrors 86, 84, and 83, a reading lens 82, and a line sensor 81. In copying a document, light irradiates the document which is set on the document table (mirror table) and fixed by a press plate 80. The optical document image is formed on the line sensor 81 via the mirrors 86, 84, and 83 and the reading lens 82. The line sensor 81 photoelectrically converts the optical document image into an electrical signal, reading image information of the document.

The image forming section 10 comprises first to fourth image forming stations Pa to Pd. The first to fourth image forming stations Pa to Pd comprise optical scanning mechanisms 1, i.e., 1*a* to 1*d*, photosensitive drums 2, i.e., 2*a* to 2*d*, chargers 3, i.e., 3*a* to 3*d*, developing units 5, i.e., 5*a* to 5*d*, and transfer units 6, i.e., 6*a* to 6*d*. In the image forming section 10, laser beams output from the laser scanning units of the optical scanning mechanisms 1*a* to 1*d* are modulated based on signals input from the line sensor 81 of the document reading section 8 to the optical scanning mechanisms 1*a* to 1*d*. The photosensitive drums 2*a* to 2*d* are irradiated with beams corresponding to pieces of image information of respective colors (cyan (C), magenta (M), yellow (Y), and black (Bk)).

The first to fourth image forming stations Pa to Pd form images in the respective colors using the photosensitive drums 2*a* to 2*d* serving as image carriers. The first to fourth image forming stations Pa to Pd take the form of an integrated process cartridge, and are demountably mounted on the housing of the image forming apparatus. The first to fourth image forming stations Pa to Pd form a cyan image (C), magenta image (M), yellow image (Y), and black image (Bk), respectively. The image formation includes charging, exposure, developing, primary transfer, and secondary transfer.

The photosensitive drums 2*a* to 2*d* are surrounded with the chargers 3*a* to 3*d*, the optical scanning mechanisms 1*a* to 1*d*, the developing units 5*a* to 5*d*, cleaning units 4, i.e., 4*a* to 4*d*, and the transfer units 6*a* to 6*d*. The developing units 5*a* to 5*d* comprise developer vessels 51, i.e., 51*a* to 51*d*, respectively. The developer vessels 51*a* to 51*d* are juxtaposed to each other immediately below the horizontal portions of the cases of the optical scanning mechanisms 1*a* to 1*d* and along the vertical portions of the cases. The developer vessels 51*a* to 51*d* are refilled with developers from mounted columnar developer cartridges.

An intermediate transfer belt 61 is an endless belt arranged below the photosensitive drums 2*a* to 2*d* of the image forming stations Pa to Pd. Toner images formed on the photosensitive drums 2*a* to 2*d* are primarily transferred onto the intermediate transfer belt 61. The intermediate transfer belt 61 is looped between a driving roller 62 and driven rollers 63 and 65, and driven to circulate by a driving source (not shown). A cleaning unit 64 is arranged near the intermediate transfer belt 61 to clean the belt surface.

An image forming operation will be explained. The first image forming station Pa forms the latent image of the cyan component of image information on the photosensitive drum 2*a* by a known electrophotographic process including charging by the charger 3*a* of the first image forming station Pa and exposure by the optical scanning mechanism 1*a*. The developing unit 5*a* visualizes the latent image into a cyan toner image with a cyan toner-containing developer. The transfer unit 6*a* transfers the cyan toner image onto the surface of the intermediate transfer belt 61.

While the cyan toner image is transferred onto the intermediate transfer belt 61, the second image forming station Pb forms the latent image of the magenta component on the photosensitive drum 2*b*. The developing unit 5*b* visualizes the latent image into a magenta toner image. In the second image forming station Pb, the transfer unit 6*b* transfers the magenta toner image at high precision onto the surface of the intermediate transfer belt 61 bearing the cyan toner image transferred by the first image forming station Pa.

The third image forming station Pc and fourth image forming station Pd also transfer yellow and black toner images onto the surface of the intermediate transfer belt 61 by the same method as described above. After the toner images of the four colors are superposed on the intermediate transfer belt 61, they are conveyed to the position of a secondary transfer roller 66 along with circulation of the intermediate transfer belt 61.

The manual paper feed cassette (multi-purpose tray) 70 holds manual feed sheets S. The paper feed cassettes 78 and 79 hold normal feed sheets S. In manual paper feed, a sheet S in the manual paper feed cassette 70 is conveyed to the position of the secondary transfer roller 66 via a pickup roller 71, conveyance rollers 72, and registration rollers 73. In normal paper feed, a sheet S in the paper feed cassette 78 or 79 is similarly conveyed to the position of the secondary transfer roller 66.

At this time, a first registration mark detection unit 68 (see FIG. 8) detects the first registration mark formed on the intermediate transfer belt 61 prior to an image, and outputs the detection signal as an enable signal for controlling the conveyance rollers. By this operation, the image position is always set at high precision using the leading end of the sheet S as a reference. Images are transferred at the same position on the sheet S. An operation of detecting (pre-detection) the first registration mark by a second registration mark detection unit 69 (see FIG. 8) will be described in detail later.

A pair of fixing rollers 74 heats and fixes toner images on the sheet S having undergone secondary transfer by the secondary transfer roller 66. Then, the sheet S bearing the full-color image is discharged onto a tray 77. After the end of primary transfer onto the intermediate transfer belt 61, the cleaning units 4*a* to 4*d* remove residual toner from the photosensitive drums 2*a* to 2*d*. The photosensitive drums 2*a* to 2*d* prepare for subsequent image formation.

Details of the optical scanning mechanisms 1*a* to 1*d* of the image forming apparatus will be explained with reference to FIGS. 2A to 2C.

Figure 2A:
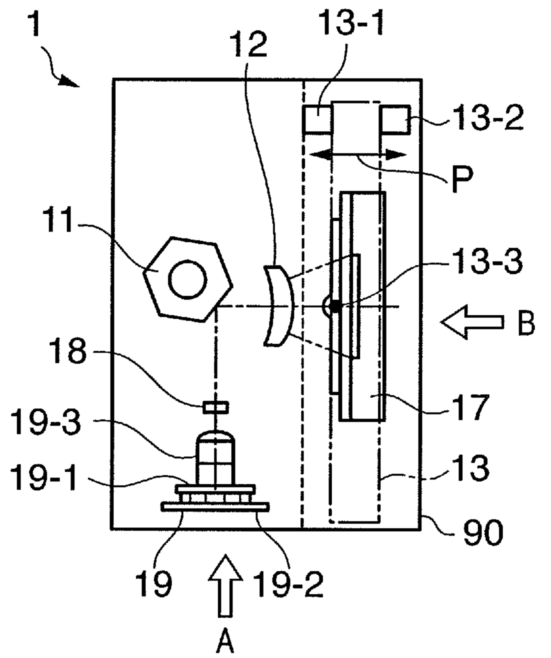
FIG. 2A is a plan view showing the structure of the main part of the optical scanning mechanism of the image forming apparatus.

FIG. 2A is a plan view showing the structure of the main part of the optical scanning mechanisms 1*a* to 1*d* of the image forming apparatus. FIG. 2B is a side view when viewed from a direction indicated by an arrow A in FIG. 2A. FIG. 2C is a side view when viewed from a direction indicated by an arrow B in FIG. 2A.

Figure 2B:
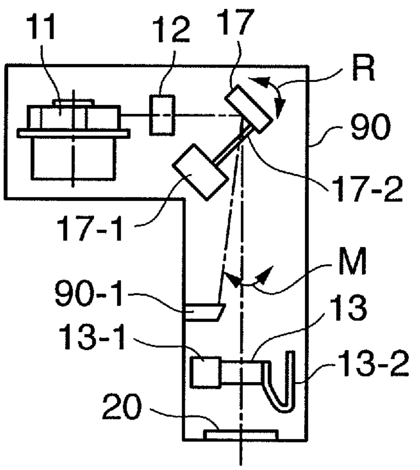
FIG. 2B is a side view when viewed from a direction indicated by an arrow A in FIG. 2A.
Figure 2C:
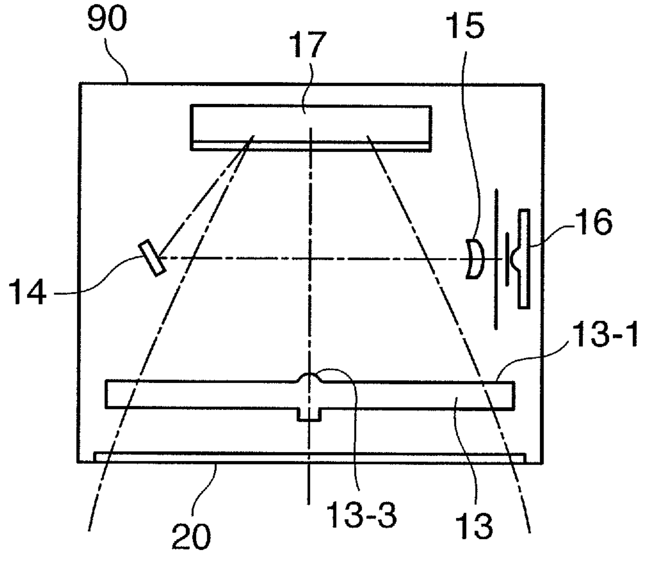
FIG. 2C is a side view when viewed from a direction indicated by an arrow B in FIG. 2A.

In FIGS. 2A to 2C, all the optical scanning mechanisms 1*a* to 1*d* shown in FIG. 1 have the same structure. Each of the optical scanning mechanisms 1*a* to 1*d* comprises a polygon mirror 11, toric lens 12, diffractive optical element 13, imaging lens 15, beam detector (BD) 16, cylindrical lens 18, and light source unit 19.

The light source unit 19 comprises a laser-emitting diode 19-1, driving electric board 19-2, collimator lens barrel 19-3, and aperture stop (not shown). The light source unit 19 emits parallel laser beams. The cylindrical lens 18 has a refracting power perpendicular to the sheet surface of FIG. 2. The polygon mirror 11 incorporates a motor, and deflects and scans a laser beam. The toric lens 12 and diffractive optical element 13 form an image at a predetermined spot diameter on the photosensitive drum, and serve as elements of the optical scanning mechanism. The diffractive optical element 13 comprises a laminated piezoelectric actuator 13-1, spring 13-2, and rotating shaft 13-3. The diffractive optical element 13 is so supported as to adjust its rotation in a direction indicated by an arrow P.

A dust-proof glass 20 is held by a case 90 slidably and detachably. The BD 16 adjusts the laser beam write timing (sync signal) on the photosensitive drum for each line. A reflecting mirror 14 reflects a beam toward the BD 16. A reflecting mirror 17 is so supported as to adjust its rotation in a direction indicated by an arrow R. A linear actuator made up of a pulse motor 17-1 and feed screw 17-2 is arranged at one support of the reflecting mirror 17, and rotates (pivots) the reflecting mirror 17. The imaging lens 15 condenses a beam reflected by the reflecting mirror 14 onto the BD 16.

The optical scanning mechanisms 1*a* to 1*d* are attached from above to the horizontal surface of the housing of the image forming apparatus or to a slightly inclined stay. The laser beam path extending from the light source unit 19 to the reflecting mirror 17 via the polygon mirror 11 is defined horizontally or slightly obliquely. The optical scanning mechanisms 1*a* to 1*d* are attached to the housing of the image forming apparatus as follows in order to initially adjust the irradiation positions of the corresponding photosensitive drums 2*a* to 2*d* to predetermined positions. That is, the position of each of the optical scanning mechanisms 1*a* to 1*d* is changed on the housing, and each of the optical scanning mechanisms 1*a* to 1*d* is fastened with four screws (not shown).

Adjustment (correction) of the position of an image to be transferred onto paper by the image forming apparatus will be explained with reference to FIGS. 3A to 3E.

Figure 3A:
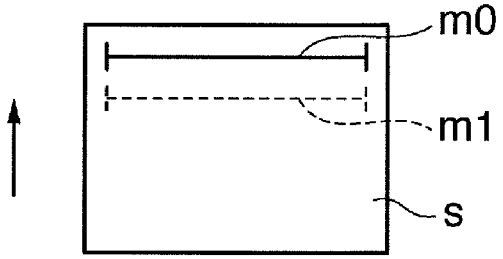
FIG. 3A is a view showing a vertical margin error.
Figure 3B:
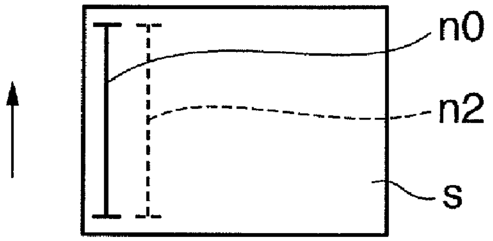
FIG. 3C is a view showing a scan line slope error.
FIG. 3D is a view showing a magnification error.
FIG. 3E is a view showing a scan line curvature.
Figure 3C:
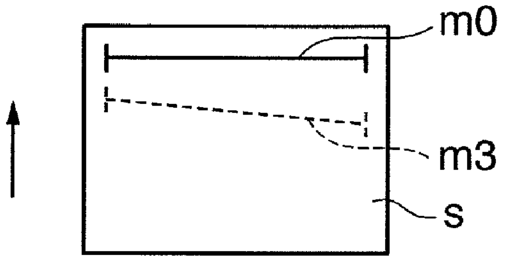
Figure 3D:
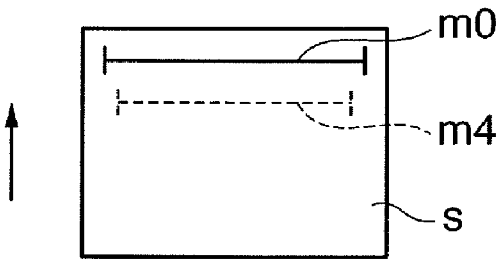
Figure 3E:
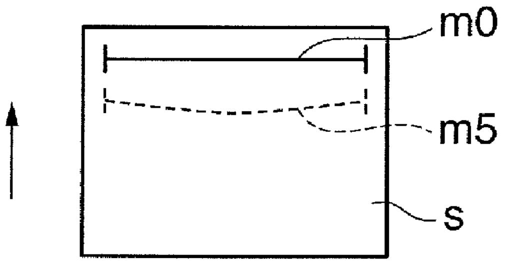

FIG. 3A is a view showing a vertical margin error. FIG. 3B is a view showing a horizontal margin error. FIG. 3C is a view showing a scan line slope error. FIG. 3D is a view showing a magnification error. FIG. 3E is a view showing a scan line curvature.

In FIGS. 3A to 3E, reference symbols m0 and n0 denote reference black (Bk) images on the sheet S; m1 and n2, images of a color (yellow Y, magenta M, or cyan C) other than black (Bk); m3, an image representing the "scan line slope error"; m4, an image representing the "magnification error"; and m5, an image representing the "scan line curvature". Arrows in FIGS. 3A to 3E indicate the conveyance direction (to be referred to as the subscanning direction hereinafter) of an image formed on the sheet S.

The parameter errors ("vertical margin error", "horizontal margin error", "scan line slope error", "magnification error", and "scan line curvature") in FIGS. 3A to 3E are adjusted as follows for the Y, M, and C image positions using the black (Bk) image position as a reference. The "vertical margin error" and "horizontal margin error" are adjusted by changing the laser write timing (timing when a laser beam irradiates the photosensitive drum to form a latent image) by a necessary time. The "magnification error" is adjusted by changing the modulation frequency of the laser-emitting diode 19-1 of the light source unit 19 by a set value.

The three adjustment items "vertical margin error", "horizontal margin error", and "magnification error" can be relatively easily adjusted by changing the electrical sync timing and frequency. However, the two adjustment items "scan line slope error" and "scan line curvature" require a bulky, expensive arrangement to adjust them by converting them into image signals. Thus, the two adjustment items "scan line slope error" and "scan line curvature" are adjusted by an optical method to be described below. An outline of this will be explained.

The "scan line slope error" is adjusted by the following adjustment mechanism. That is, the "scan line slope error" is adjusted (corrected) by rotating the diffractive optical element 13 by the laminated piezoelectric actuator 13-1 about the rotating shaft 13-3 in a direction indicated by the arrow P. The "scan line curvature" is adjusted by the following adjustment mechanism. That is, the "scan line curvature" is adjusted (corrected) by pivoting and displacing the reflecting mirror 17 by a set amount in a direction indicated by the arrow R by the linear actuator made up of the pulse motor 17-1 and feed screw 17-2, and adjusting the incident angle of a beam to the diffractive optical element 13.

Adjustment (correction) of the "scan line slope error" in the image forming apparatus will be further described with reference to FIG. 4.

Figure 4:
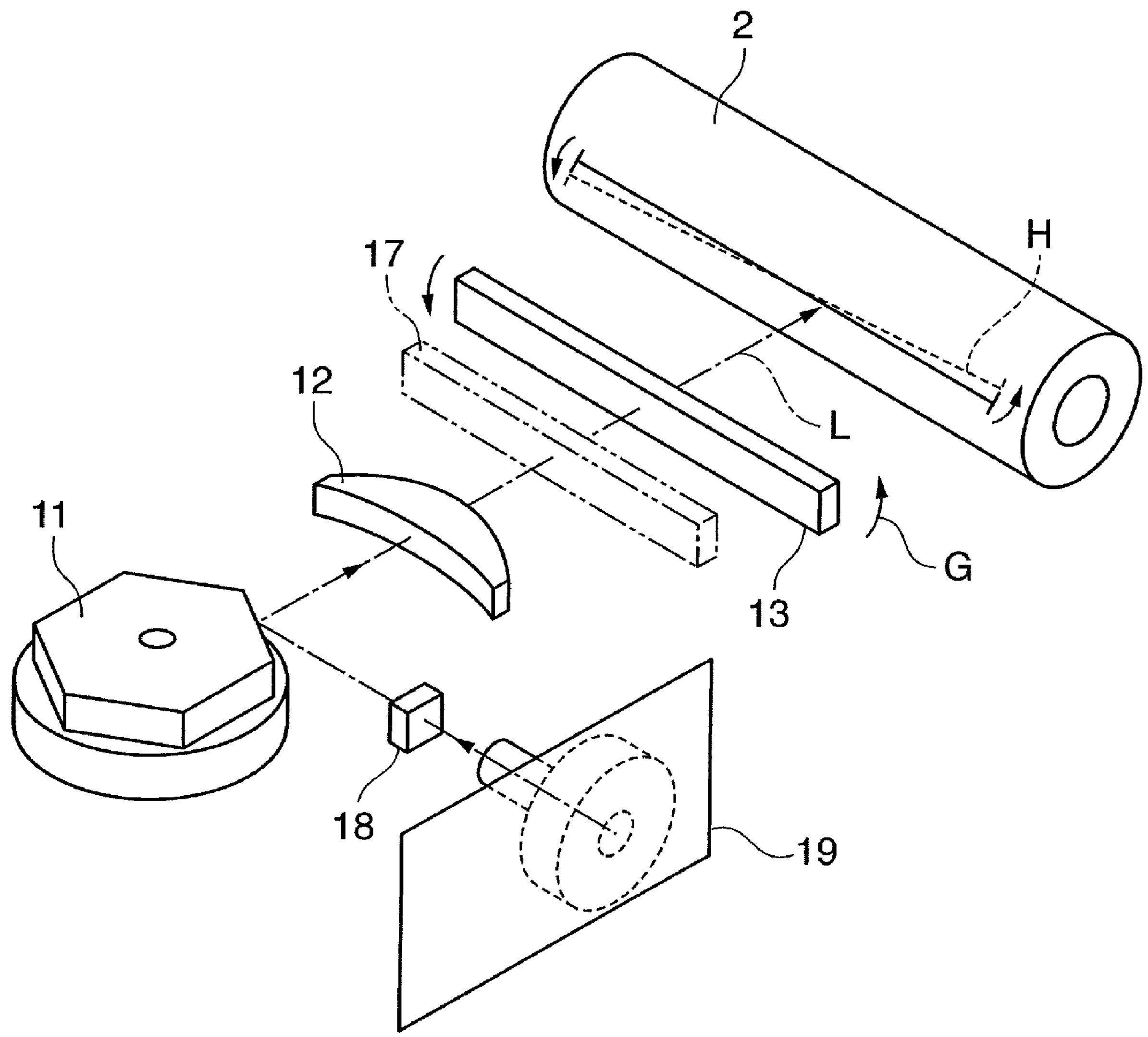
FIG. 4 is a schematic view showing a state in which the optical scanning mechanism and photosensitive drum of the image forming apparatus are exploded into a range containing one plane, in order to explain adjustment of the slope error.

FIG. 4 is a schematic view showing a state in which the optical scanning mechanism and photosensitive drum are exploded into a range containing one plane, in order to explain adjustment of the slope error.

In FIG. 4, a beam emitted from the light source unit 19 of the optical scanning mechanism passes through the cylindrical lens 18 having a predetermined refracting power in the subscanning direction. Then, the beam is linearly condensed on the polarization plane of the polygon mirror 11. The polygon mirror 11 deflects and reflects the beam to irradiate the surface of the photosensitive drum 2 via the toric lens 12, reflecting mirror 17, and diffractive optical element 13. In FIG. 4, reference symbol L denotes the central axis of scanning and the optical axis of the toric lens 12.

In the optical scanning mechanism, the diffractive optical element 13 pivots (rotates and moves) almost about the optical axis in a direction indicated by an arrow G. Along with this, the beam scans the surface of the photosensitive drum 2 obliquely in the longitudinal direction of the drum surface, as indicated by a broken line H. The pivoting amount (rotation moving amount) of the diffractive optical element 13 is almost proportional to the slope amount of the scan line. Thus, the "scan line slope error" can be adjusted by pivoting the diffractive optical element 13 by an amount necessary to correct the "scan line slope error".

Figure 8:
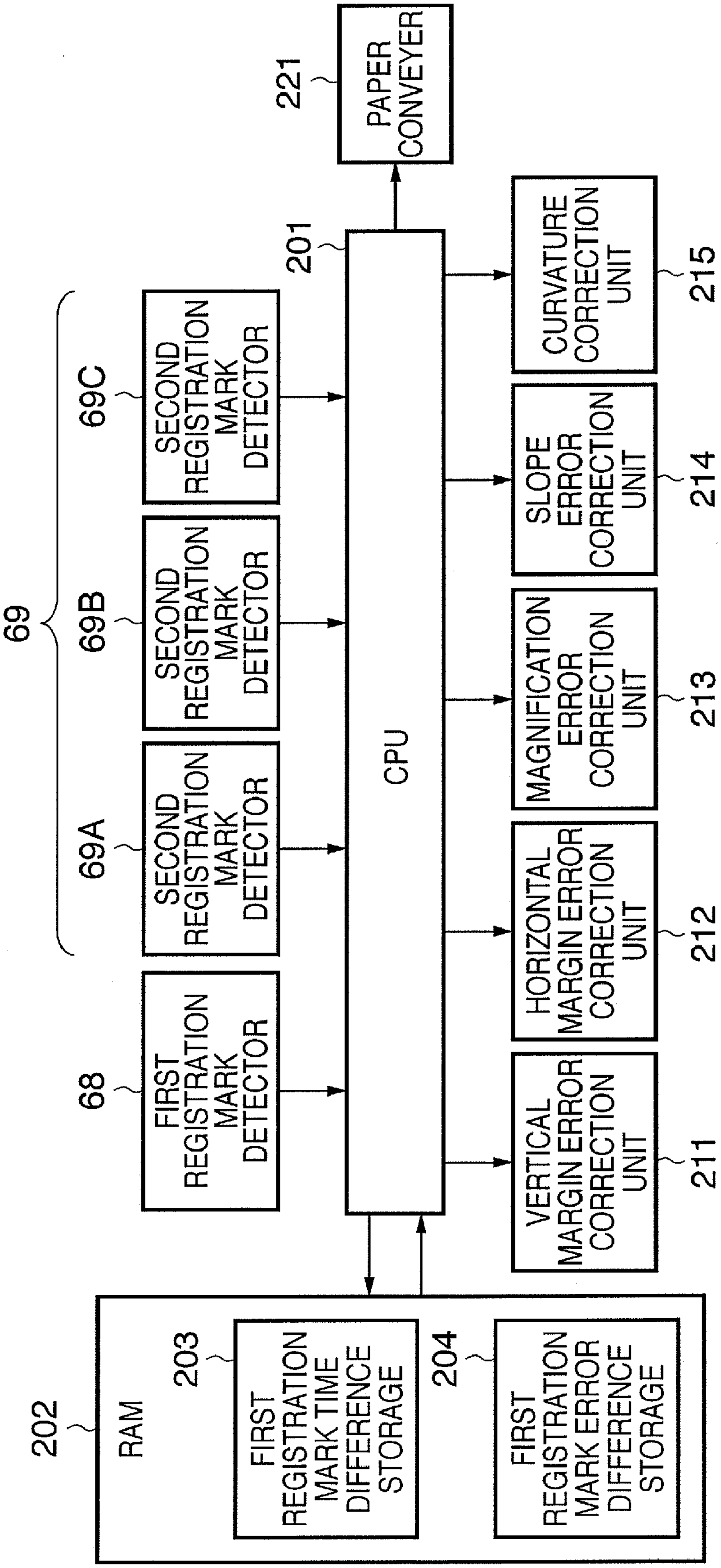
FIG. 8 is a block diagram showing the arrangement of the main part of the image forming apparatus.

More specifically, according to the embodiment, the diffractive optical element 13 pivots by a set amount almost about the optical axis based on a signal (detection result) obtained by detection of the second registration mark detection unit 69 (see FIG. 8). As a result, the "scan line slope error" can be adjusted.

Adjustment (correction) of the "scan line curvature" in the image forming apparatus will be further described with reference to FIG. 5.

Figure 5:
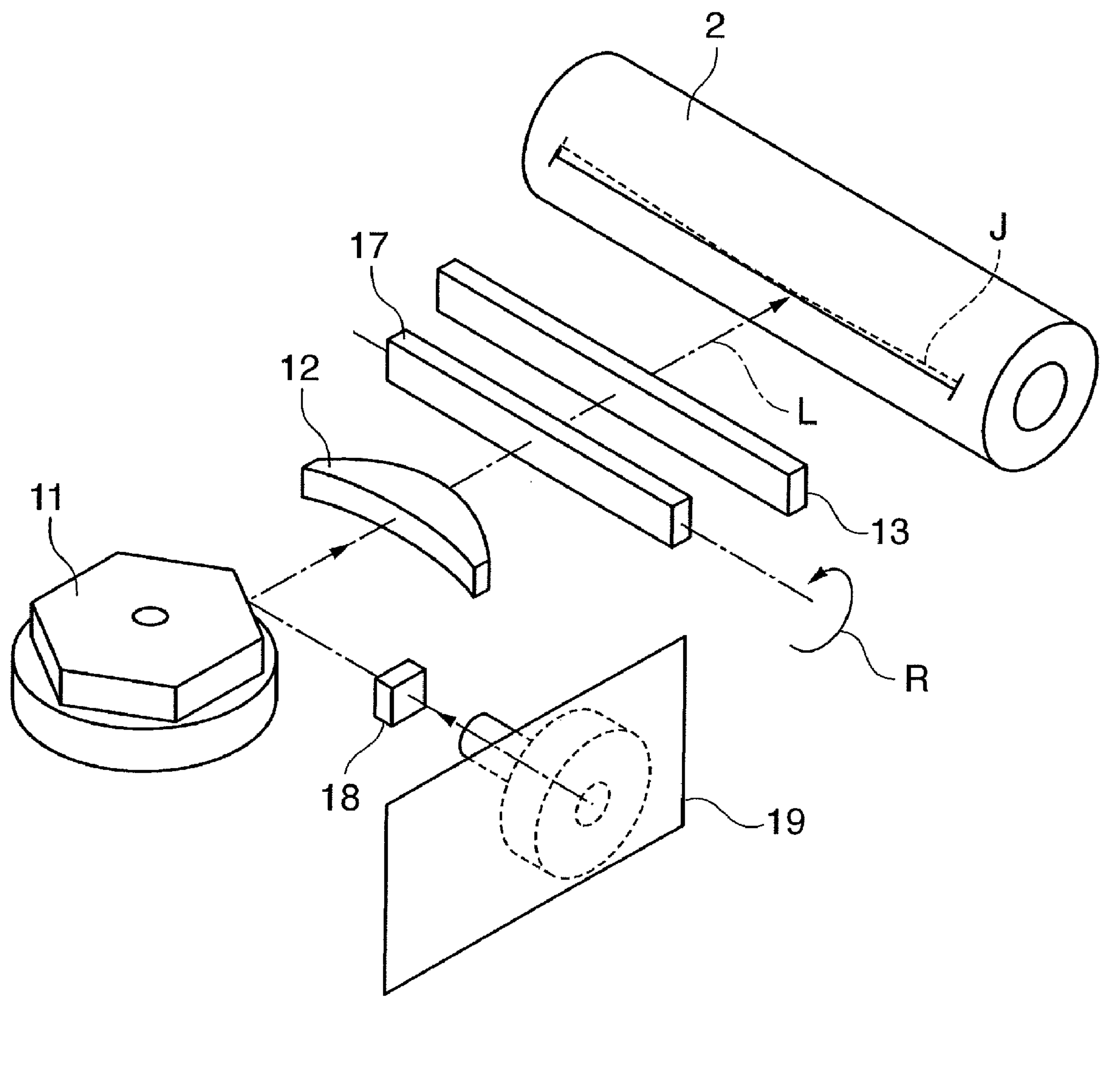
FIG. 5 is a schematic view showing a state in which the optical scanning mechanism and photosensitive drum of the image forming apparatus are exploded into a range containing one plane, in order to explain adjustment of the scan line curvature.

FIG. 5 is a schematic view showing a state in which the optical scanning mechanism and photosensitive drum are exploded into a range containing one plane, in order to explain adjustment of the scan line curvature.

In FIG. 5, in the optical scanning mechanism, the reflecting surface of the reflecting mirror 17 pivots (rotates and moves) about the optical axis L (corresponding to the central axis of scanning and the optical axis of the toric lens 12) in a direction indicated by an arrow R, thereby changing the angle of the axis L of light incident on the diffractive optical element 13. Along with this, a beam curves and scans the surface of the photosensitive drum 2, as indicated by a broken line J. The angle of light incident on the diffractive optical element 13 is almost proportional to the curvature amount of the scan line. For this reason, the "scan line curvature" can be adjusted by changing the angle of light incident on the diffractive optical element 13, that is, rotating the reflecting mirror 17 by an amount necessary to correct the "scan line curvature".

More specifically, according to the embodiment, the reflecting surface of the reflecting mirror 17 pivots at a set angle about the optical axis based on a signal (detection result) obtained by detection of the second registration mark detection unit 69 (see FIG. 8), similar to adjustment of the "scan line slope error". Accordingly, the "scan line curvature" can be adjusted.

In the embodiment, when the "scan line slope error" is adjusted, the vertical margin in FIG. 3A and the magnification in FIG. 3D vary slightly upon pivoting the reflecting mirror 17. These variations are easily predicted and corrected by changing the above-mentioned electrical sync timing and frequency.

In the embodiment, separate optical elements provide adjustment mechanisms for adjusting the "scan line slope error" and "scan line curvature", preventing complication of the adjustment mechanisms. Hence, optical components subjected to adjustment can be stably supported.

The first and second registration mark detection units of the image forming apparatus will be described in detail with reference to FIGS. 6 to 8.

Figure 6:
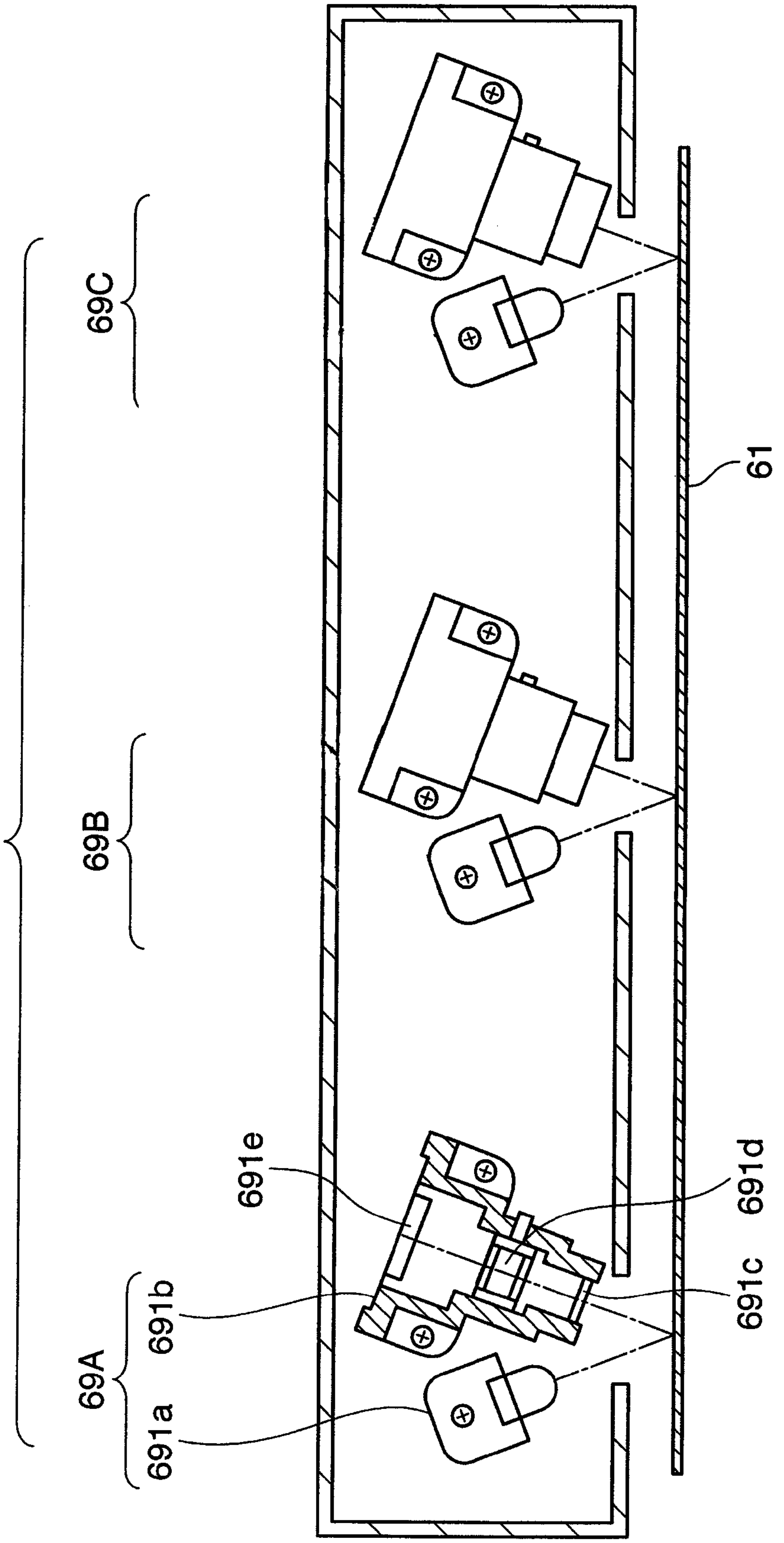
FIG. 6 is a sectional view showing the structure of the second registration mark detection unit of the image forming apparatus.

FIG. 6 is a sectional view showing the structure of the second registration mark detection unit of the image forming apparatus.

In FIG. 6, the second registration mark detection unit 69 detects the second registration mark formed on the intermediate transfer belt 61, that is, misregistration information of each color toner image. The second registration mark detection unit 69 comprises second registration mark detectors 69A, 69B, and 69C.

The second registration mark detectors 69A, 69B, and 69C are arranged at three, far, center, and near portions in the widthwise direction of the intermediate transfer belt 61. The second registration mark detectors 69A, 69B, and 69C function as image reading units. The first registration mark detection unit 68 (see FIG. 8: to be described later) detects the first registration mark.

The first registration mark is used to determine the transfer position of an image on paper. For this purpose, the first registration mark is formed outside the image area on the intermediate transfer belt 61 and in a direction perpendicular to the conveyance direction. The first registration mark exists upstream of the second registration mark. The second registration mark is used to detect the amount of image misregistration when transferring, onto the intermediate transfer belt 61, toner images formed on the photosensitive drums and superposing them. For this purpose, the second registration mark is formed outside the image area on the intermediate transfer belt 61 and in a direction perpendicular to the conveyance direction. The second registration marks are formed at predetermined intervals in the conveyance direction. Details of the first and second registration marks will be explained with reference to FIG. 7.

FIG. 8 is a block diagram showing the arrangement of the main part of the image forming apparatus.

In FIG. 8, the image forming apparatus comprises the first registration mark detection unit 68, the second registration mark detection unit 69, a CPU 201, a RAM 202, a vertical margin error correction unit 211, a horizontal margin error correction unit 212, a magnification error correction unit 213, a slope error correction unit 214, a curvature correction unit 215, and a paper conveyer 221. The RAM 202 comprises a first registration mark time difference storage 203 and first registration mark error difference storage 204.

The CPU 201 controls the respective units in FIG. 8, and executes calculation (to be described later). The first registration mark time difference storage 203 stores the time difference between first registration mark signals detected by the second registration mark detectors 69A, 69B, and 69C. The first registration mark error difference storage 204 stores the first registration mark error difference (time difference from an error signal (to be described later)).

The vertical margin error correction unit 211 corrects a vertical margin error. The horizontal margin error correction unit 212 corrects a horizontal margin error. The magnification error correction unit 213 corrects a magnification error. The slope error correction unit 214 corrects a scan line slope error. The curvature correction unit 215 corrects a scan line curvature. The paper conveyer 221 conveys paper under the control of the CPU 201, and includes a conveyance roller and motor.

The second registration mark detectors 69A, 69B, and 69C have the same arrangement, so the second registration mark detector 69A will be exemplified. The second registration mark detector 69A comprises a light-emitting unit (lamp) 691*a* and light-receiving unit 691*b*. The light-receiving unit 691*b* comprises a dust-proof glass 691*c* whose surface is covered with a filter film for cutting light except for infrared light, an imaging lens 691*d* for forming an optical image on a CCD, and a CCD 691*e* for photoelectrically converting a formed optical image into an electrical signal.

The light-emitting unit (lamp) 691*a* emits infrared light from above to the surface of the intermediate transfer belt 61 moving at a predetermined speed in a direction perpendicular to the sheet surface of FIG. 6. The light-receiving unit 691*b* forms reflected light from the intermediate transfer belt 61 into an image on the imaging lens 691*d* and CCD 691*e* via the dust-proof glass 691*c*.

For example, the resolution of the second registration mark detector 69A on the intermediate transfer belt 61 is set to 10 μm in the line direction of the CCD 691*e*. The reading cycle of each line is set to 0.1 msec with respect to a moving speed "100 mm/s" of the intermediate transfer belt 61. The second registration mark detector 69A can read an image on the intermediate transfer belt at the resolution of 10 μm even in the moving direction of the intermediate transfer belt 61.

The first to fourth image forming stations Pa to Pd form images as the second registration marks at predetermined target positions on the intermediate transfer belt 61. The second registration mark detection unit 69 reads the image positions of the second registration marks. The CPU 201 calculates the reading results and detects the amounts of image misregistration of parameters on the intermediate transfer belt at the formation positions of images formed by the first to fourth image forming stations Pa to Pd. Then, the CPU 201 executes the above-described correction (adjustment).

According to the embodiment, the second registration mark detection unit 69 can measure the amounts of error for the following five parameters: vertical margin error A, horizontal margin error B, scan line slope error C, magnification error D, and scan line curvature E.

The second registration mark detection unit 69 also serves as a pre-detection unit which detects the first registration mark formed on the intermediate transfer belt 61. Thus, the second registration mark detection unit 69 reads the first registration mark, too.

The first registration mark detection unit 68 detects the first registration mark formed on the intermediate transfer belt 61, that is, image position information. The first registration mark detection unit 68 is arranged upstream of the second registration mark detection unit 69 with respect to the intermediate transfer belt 61. Further, the first registration mark detection unit 68 is arranged at the same position (center in the widthwise direction of the belt) as the second registration mark detector 69B of the second registration mark detection unit 69 in a direction (to be referred to as the main scanning direction hereinafter) perpendicular to the image conveyance direction of the intermediate transfer belt 61. The first registration mark detection unit 68 has the same arrangement as that of the second registration mark detection unit 69, and a description thereof will not be repeated.

The first registration mark is a toner image in black formed by the fourth image forming station Pd. The first registration mark detection unit 68 reads the image position of the first registration mark. The CPU 201 calculates the reading result, and uses the resultant signal as an enable signal for controlling conveyance of the sheet S.

Figure 7:
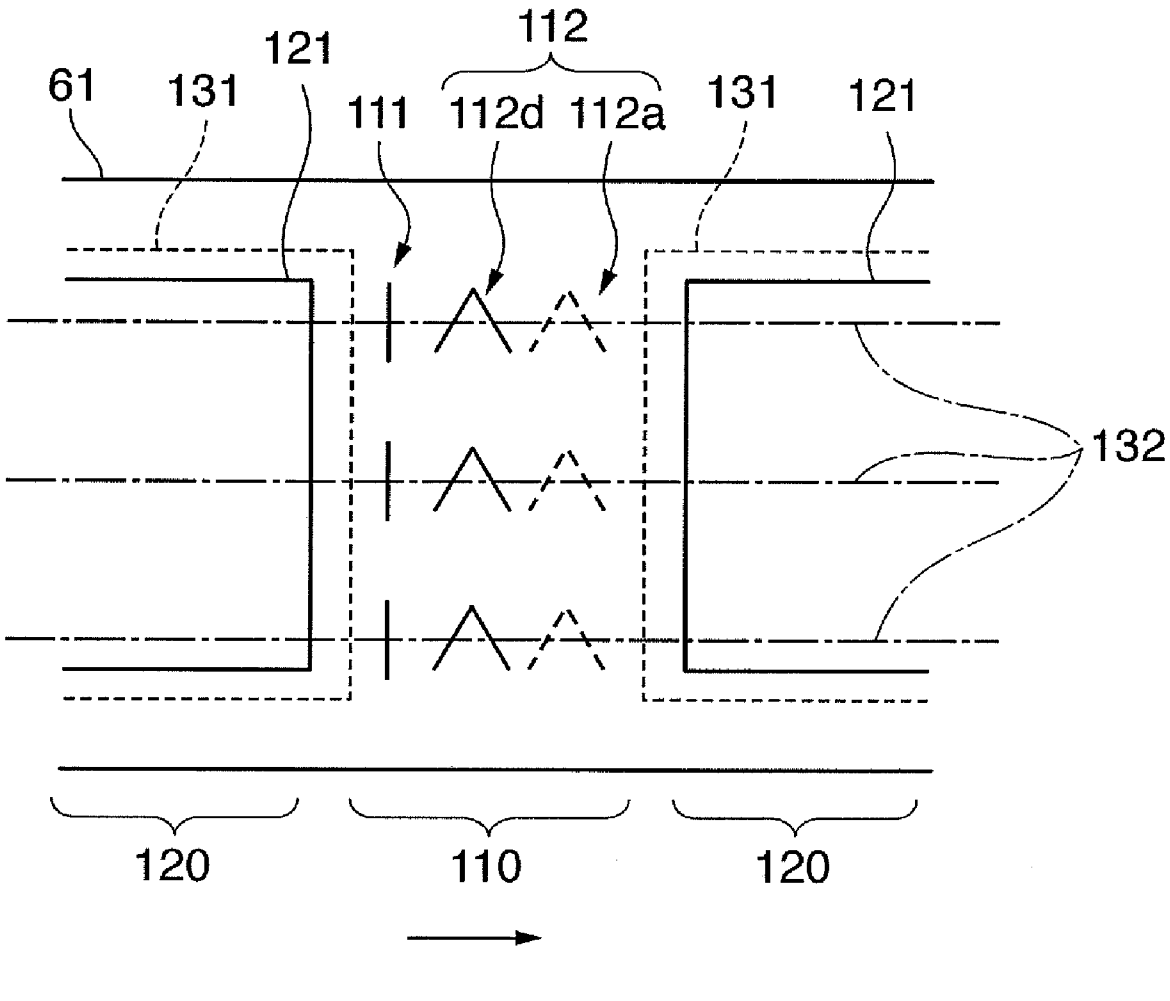
FIG. 7 is a view showing a state in which the first registration mark, second registration mark, and image are formed on the intermediate transfer belt of the image forming apparatus.

FIG. 7 is a view showing a state in which the first registration mark, second registration mark, and image are formed on the intermediate transfer belt of the image forming apparatus.

In FIG. 7, a first registration mark 111 and second registration mark 112 are formed in a mark forming area 110 on the intermediate transfer belt 61. Each image 121 is formed in an image forming area 120 on the intermediate transfer belt 61. A broken line 131 in FIG. 7 represents the size of paper to which an image is secondarily transferred from the intermediate transfer belt 61. The mark forming area 110 is defined at each position (each sheet interval) between sheets. A chain line 132 in FIG. 7 represents the arrangement position of the second registration mark detection unit 69. An arrow indicates the conveyance direction of the intermediate transfer belt 61.

Of the first to fourth image forming stations Pa to Pd, the fourth image forming station Pd forms a plurality of first registration marks 111 (or a line of first registration marks 111) in black (Bk) in the main scanning direction. Each image 121 is formed a predetermined number of lines after the first registration marks 111 are formed. A plurality of second registration marks 112 are formed in the main scanning direction. The first to fourth image forming stations Pa to Pd form the second registration marks 112 at set intervals in the subscanning direction.

The fourth image forming station Pd (Bk) forms second registration marks 112*d* out of the second registration marks 112. The third image forming station Pc (Y) forms second registration marks 112*a*. The second registration mark 112*a* is represented by a broken line for illustrative convenience, but in practice, formed from an unbroken line, similar to the second registration mark 112*d*.

As described above, the second registration mark 112 is used to detect the misregistration between cyan (C), magenta (M), yellow (Y), and black (Bk) images formed on the intermediate transfer belt 61 by the first to fourth image forming stations Pa to Pd. The shape of the second registration mark 112 is not limited to "^" shown in FIG. 7, and may be another one (e.g., "+" or "#"). The misregistration between M and C images is detected by forming M and C second registration marks at sheet intervals (not shown) on the intermediate transfer belt 61 instead of Y second registration marks.

The first registration mark 111 is not limited to Bk, and suffices to be formed by one of the Y, M, and C image forming stations. In order to detect image misregistration, all Y, M, C, and Bk second registration marks may be formed at the same sheet interval.

FIGS. 9A to 9F are timing charts showing registration mark detection signals.

In FIGS. 9A to 9F, reference numeral 101A denotes a first registration mark detection signal obtained by comparing a signal read by the second registration mark detector 69A at a predetermined slice level; and 102A and 103A, similarly compared second registration mark detection signals. Reference numeral 101B denotes a first registration mark detection signal obtained by comparing a signal read by the second registration mark detector 69B; and 102B and 103B, similarly compared second registration mark detection signals. Reference numeral 101C denotes a first registration mark detection signal obtained by comparing a signal read by the second registration mark detector 69C; and 102C and 103C, similarly compared second registration mark detection signals.

The CPU 201 executes calculation based on each registration mark detection signal, and determines, as a registration mark position, the center position between the leading and trailing edges.

Variations tA-B and tB-C between signals read by the second registration mark detectors 69A to 69C arise not from misregistration of registration marks formed on the intermediate transfer belt 61, but from the arrangement error or angle error between these detectors in the subscanning direction. Thus, the variations tA-B and tB-C differ between image forming apparatuses. The variations (measured time differences) tA-B and tB-C are stored as first registration mark time differences in the first registration mark time difference storage 203 of the RAM 202.

As described above, the second registration mark detection signals 102A and 103A are read by the second registration mark detector 69A. Referring to FIG. 7, the second registration mark detection signal 102A is formed by the fourth image forming station Pd (Bk). The second registration mark detection signal 103A is formed by the third image forming station Pc (Y).

tr1 represents the time interval between two slants (two, right and left lines of "^") of the second registration mark formed by the fourth image forming station Pd (Bk). tr2 represents the time interval between the two slants of the second registration mark formed by the third image forming station Pc (Y). tr3 represents the time interval between the center position between the registration mark positions of second registration marks formed by the fourth image forming station Pd (Bk), and that between the registration mark positions of second registration marks formed by the third image forming station Pc (Y).

The CPU 201 executes calculation based on tr1 and tr2 obtained from the second registration mark detectors 69A, 69B, and 69C. The CPU 201 sends calculated correction values to the horizontal margin error correction unit 212 and magnification error correction unit 213.

Similarly, the CPU 201 executes calculation on the basis of tr3 obtained from the second registration mark detectors 69A, 69B, and 69C. The CPU 201 sends calculated correction values to the vertical margin error correction unit 211, slope error correction unit 214, and curvature correction unit 215.

A first registration mark detection signal 104 is read by the first registration mark detection unit 68. The detection area is masked as shown in FIG. 9E, so the first registration mark detection unit 68 detects only the first registration mark. Since the first registration mark detection unit 68 is at the same position as the second registration mark detection unit 69 in the main scanning direction, it detects the same signal as the first registration mark detection signal 101B after a delay time ta-b corresponding to the conveyance speed of the intermediate transfer belt 61.

The CPU 201 has a function of, when the width of a registration mark detection signal becomes equal to or larger than a set value owing to the following factor, determining the registration mark detection signal as an error signal.

A registration mark detection error will be described with reference to FIGS. 10A to 10C.

Figure 10A:
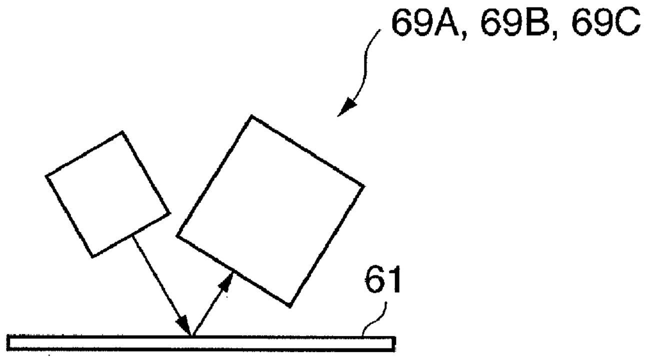
FIGS. 10A to 10C are views for explaining the factor of a registration mark detection error.
Figure 10B:
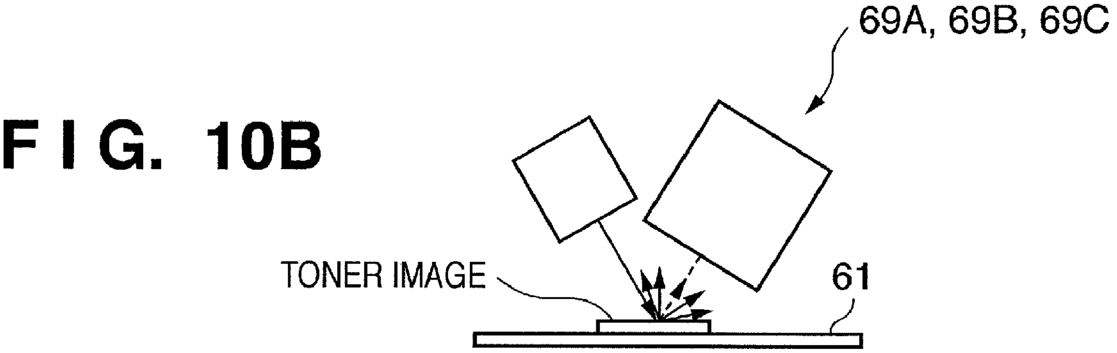
Figure 10C:
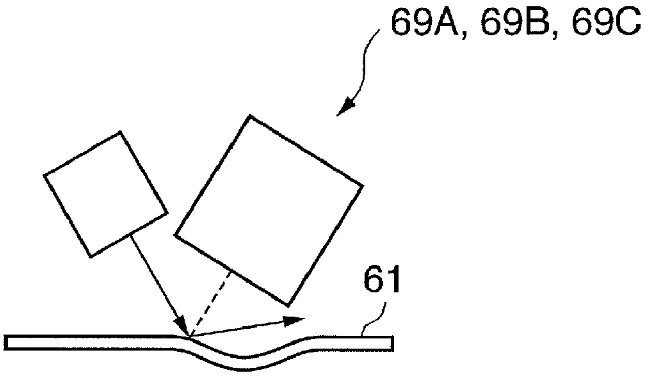

FIGS. 10A to 10C are views for explaining the factor of the registration mark detection error.

In FIGS. 10A to 10C, the second registration mark detector 69A (or second registration mark detector 69B or 69C) is the same as that shown in FIG. 6 and is simplified. In FIGS. 10A to 10C, the second registration mark detector 69A will be exemplified. FIG. 10A shows a state in which no toner image is formed on the intermediate transfer belt 61. Since the second registration mark detector 69A is a reflection sensor, most infrared light emitted from the light-emitting unit onto the intermediate transfer belt 61 returns to the light-receiving unit (detection side).

FIG. 10B shows a state in which a toner image is formed on the intermediate transfer belt 61. In this state, infrared light emitted from the light-emitting unit of the second registration mark detector 69A is reflected and diffused by the toner surface, and most of it does not return to the light-receiving unit (detection side). FIG. 10C shows a state in which the intermediate transfer belt 61 has a dent or the like. In this state, infrared light emitted from the light-emitting unit of the second registration mark detector 69A is reflected by the surface of the intermediate transfer belt 61, and regularly reflected light does not travel toward the CCD of the light-receiving unit. As a result, it is erroneously detected that a toner image exists.

FIG. 10C shows a dent along the subscanning direction on the intermediate transfer belt 61. However, the same problem also occurs when the intermediate transfer belt 61 dents along the main scanning direction. The intermediate transfer belt 61 often dents when it flexes by its own weight when attached/detached to/from the housing of the image forming apparatus. In many cases, the dent appears along the main scanning direction on the intermediate transfer belt 61.

If the registration mark partially overlaps the dent of the intermediate transfer belt 61, the width of the detection signal increases, failing in detecting an accurate registration mark position. It is known that the registration mark position detected in this state deviates by about 1 mm from a registration mark position accurately detected in a state in which the intermediate transfer belt 61 does not dent.

Error determination of detection by the second registration mark detectors 69A, 69B, and 69C, and a method of determining the amount of first registration mark position correction will be explained with reference to FIGS. 11A to 13C.

FIGS. 11A to 11C, 12A to 12C, and 13A to 13C are timing charts showing registration mark detection signals.

Figure 15:
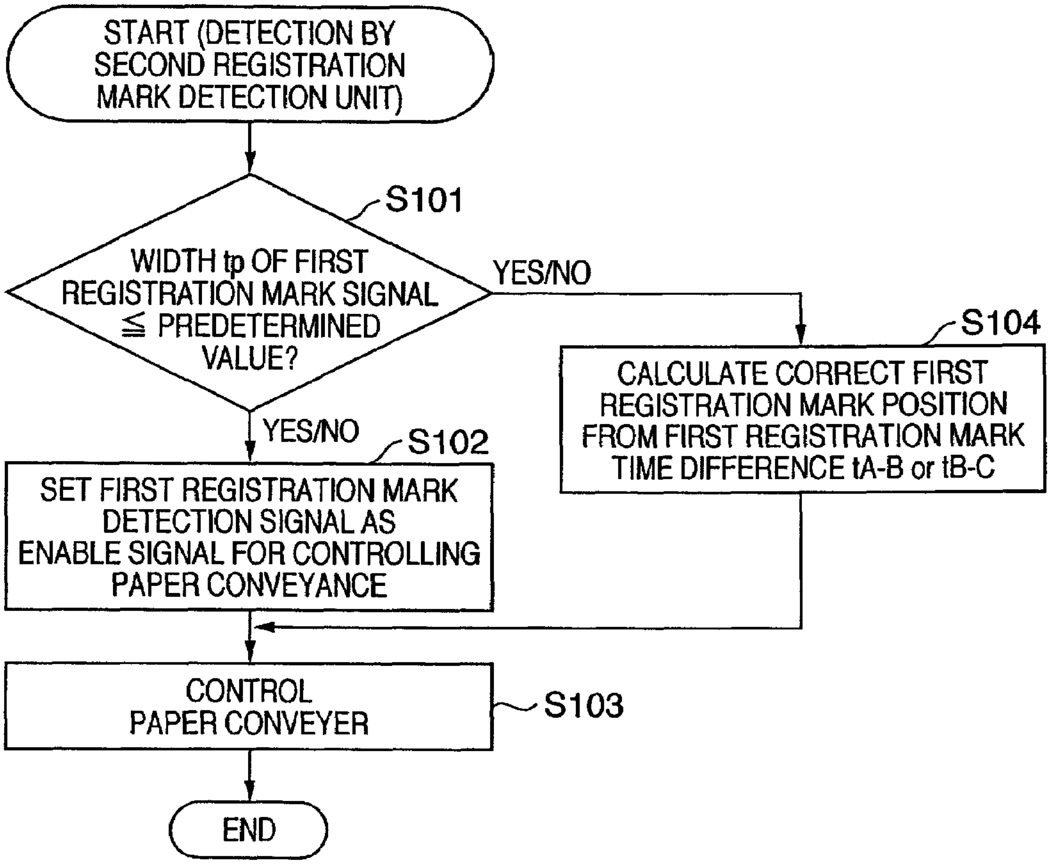
FIG. 15 is a flowchart showing an example of controlling a paper conveyer.

FIG. 15 is a flowchart showing an example of controlling the paper conveyer based on the first registration mark signal detected by the second registration mark detection unit. The CPU 201 performs this process.

Figures 11A, 11B, 11C:
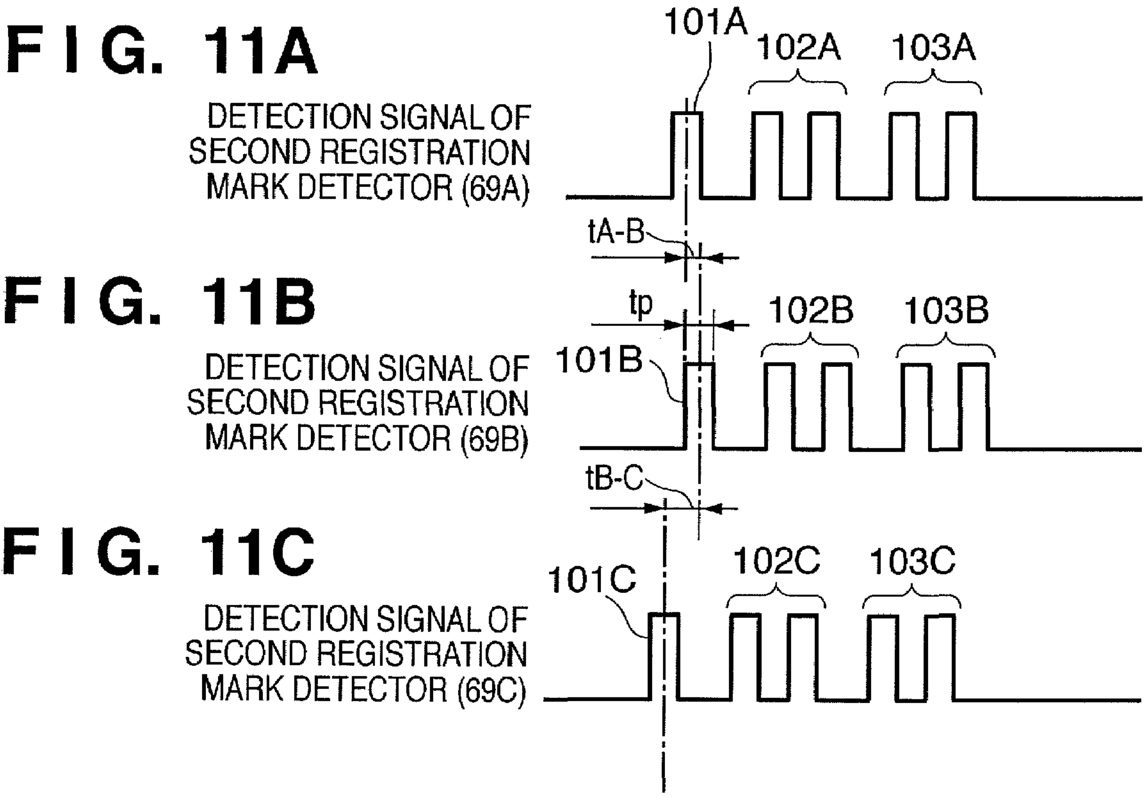
FIGS. 11A to 11C are timing charts showing registration mark detection signals.

As shown in FIGS. 11A to 11C, the CPU 201 serving as a determination means determines whether a width tp of the first registration mark signal 101B detected by the second registration mark detector 69B is equal to or smaller than a set value (step 101 of FIG. 15). If the width tp is equal to or smaller than the set value, the CPU 201 determines that the registration mark signal 101B detected by the second registration mark detector 69B is correct. The CPU 201 sets, as an enable signal for controlling paper conveyance, the first registration mark detection signal detected by the first registration mark detection unit 68 (step 102). Then, the CPU 201 controls the paper conveyer 221 (step 103).

Figures 12A, 12B, 12C:
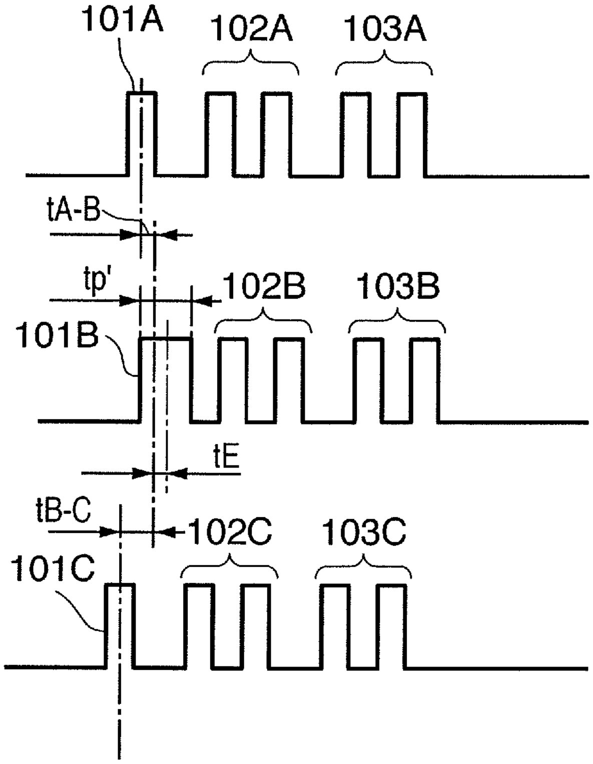
FIGS. 12A to 12C are timing charts showing registration mark detection signals.

As shown in FIGS. 12A to 12C, if a width tp' of a first registration mark signal 110B' detected by the second registration mark detector 69B is larger than a set value, the CPU 201 determines that the first registration mark signal 101B' is an error signal. The CPU 201 calculates a correct first registration mark position based on the first registration mark time difference tA-B or tB-C (or tA-B and tB-C) stored in advance in the first registration mark time difference storage 203 of the RAM 202 (step 104).

The CPU 201 also serving as a control unit stores a time difference tE from the determined error signal in the first registration mark error difference storage 204. The CPU 201 sets, as a correct first registration mark position, a position shifted by tE measured from the error signal, from the first registration mark detection signal detected by the first registration mark detection unit 68. Then, the CPU 201 controls the paper conveyer 221 (step 103).

Figure 13A:
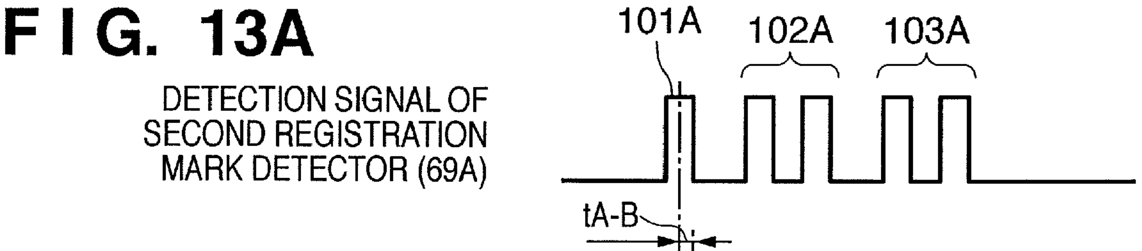
FIGS. 13A to 13C are timing charts showing registration mark detection signals.
Figure 13B:
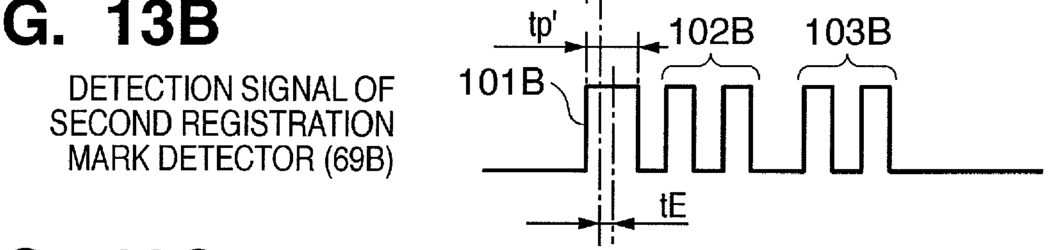
Figure 13C:
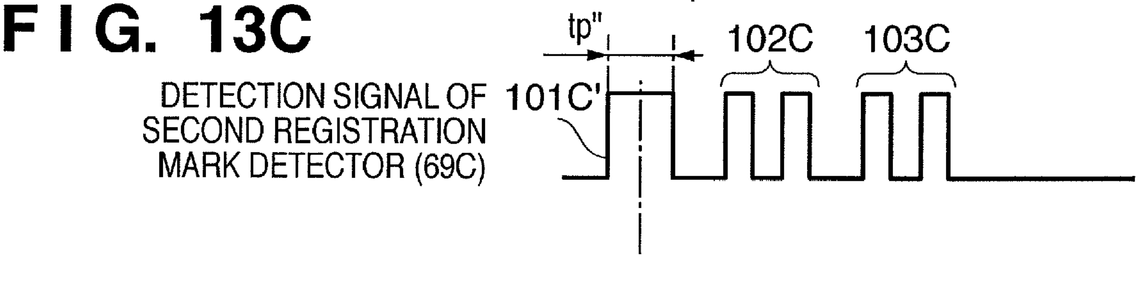
Figure 14:
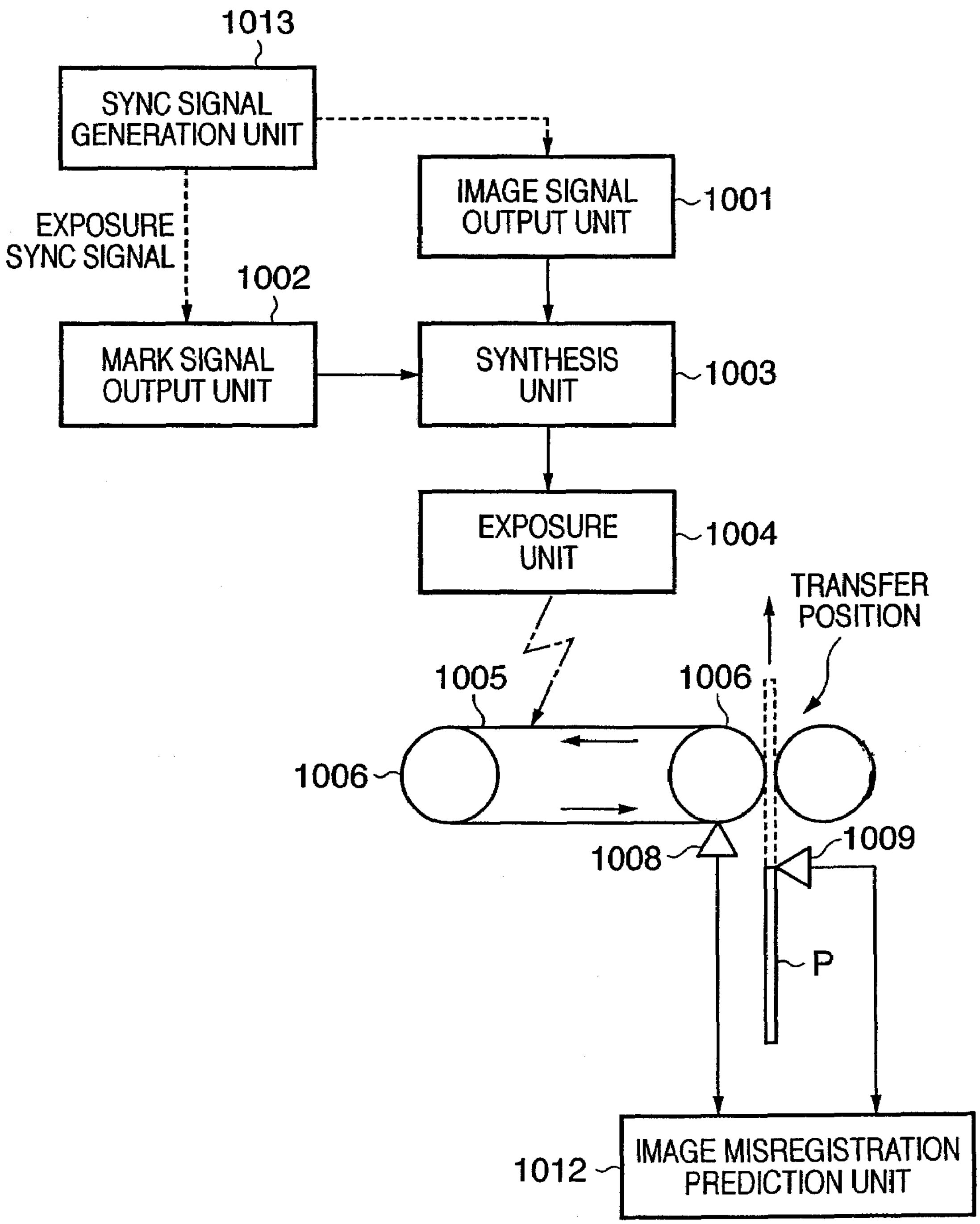
FIG. 14 PRIOR ART
FIG. 14 is a block diagram showing the schematic arrangement of the main part of a conventional image forming apparatus.

As shown in FIGS. 13A to 13C, if the CPU 201 determines that first registration mark signals 101B' and 101C' respectively detected by the second registration mark detectors 69B and 69C are error signals, it calculates a correct first registration mark position from the first registration mark time difference tA-B. Similarly, if the CPU 201 determines that first registration mark signals 101A' and 101B' respectively detected by the second registration mark detectors 69A and 69B are error signals, it calculates a correct first registration mark position from the first registration mark time difference tB-C. From this, if at least one of first registration marks respectively detected by the second registration mark detectors 69A, 69B, and 69C is accurately detected, an image can be positioned on paper at high precision.

As a method of obtaining the first registration mark time differences tA-B and tB-C, while a value immediately before determining that the first registration mark detection signal is an error is sequentially updated, the value may be stored in the first registration mark time difference storage 203 of the RAM 202. Alternatively, the first registration mark time difference storage 203 of the RAM 202 may store an average of values at which it is determined that all first registration mark detection values are correct.

As a method of obtaining a plurality of first registration mark detection signals, the embodiment may employ a mode in which only a plurality of first registration marks are formed on the intermediate transfer belt 61 in a state other than image formation, or a mode in which first and second registration marks are formed.

The position where the first registration mark detection unit 68 is arranged may not be the same as that of the second registration mark detector 69B in the main scanning direction, and may be the same as the position of the second registration mark detector 69A or 69C.

If neither the amount of scan line curvature correction is detected nor the scan line curvature is corrected, the second registration mark detector 69B at the center of the intermediate transfer belt 61 in the widthwise direction may be omitted.

As described above, the embodiment utilizes the second registration mark detectors 69A, 69B, and 69C as pre-detection means for detecting the first registration mark. The CPU 201 determines whether the detection signal of the first registration mark at the center detected by the second registration mark detector is correct. Based on this, the CPU 201 controls paper conveyance. Even if a scratch or the like exists on the intermediate transfer belt 61, the first registration mark can be detected at high precision to form an image on paper at high precision. As a result, the present invention can provide a high-print-quality image forming apparatus.

Other Embodiments

The embodiment has exemplified, as an image forming apparatus, a copying apparatus which forms an image by electrophotography. However, the present invention is not limited to this, and is also applicable to a printer or multi-function peripheral which forms an image by electrophotography.

The object of the present invention is also achieved by supplying a storage medium which stores software program codes for implementing the functions of the above-described embodiment to a system or apparatus, and performing the following process. That is, the computer (or the CPU or MPU) of the system or apparatus reads out and executes the program codes stored in the storage medium.

In this case, the program codes read out from the storage medium implement the functions of the above-described embodiment, and the program codes and the storage medium which stores the program codes constitute the present invention.

The storage medium for supplying the program codes includes a Floppy® disk, hard disk, and magnetooptical disk. The storage medium also includes an optical disk (e.g., CD-ROM, CD-R, CD-RW, DVD-ROM, DVD-RAM, DVD-RW, or DVD+RW), magnetic tape, nonvolatile memory card, and ROM. The program codes may also be downloaded via a network.

The functions of the above-described embodiment are implemented by executing the readout program codes by the computer. Also, the present invention includes a case where an OS (Operating System) or the like running on the computer performs some or all of actual processes on the basis of the instructions of the program codes and thereby implements the functions of the above-described embodiment.

Furthermore, the present invention includes a case where the functions of the above-described embodiments are implemented by the following process. That is, the program codes read out from the storage medium are written in the memory of a function expansion board inserted into the computer or the memory of a function expansion unit connected to the computer. After that, the CPU of the function expansion board or function expansion unit performs some or all of actual processes based on the instructions of the program codes.

According to the present invention, the second detection means for detecting the second reference mark is used as a pre-detection means for detecting the first reference mark. It is determined whether the detection signal of the first reference mark detected by the second detection means is correct. Then, paper conveyance is controlled. Even if a scratch or the like exists on the intermediate transfer member, the first reference mark can be detected at high precision to form an image on paper at high precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-253205, filed on Sep. 19, 2006, which is hereby incorporated by reference herein in its entirety.

What is claimed is:

1. An image forming apparatus comprising:

an intermediate transfer member adapted to be able to form a color image by superposing and transferring images formed on image carriers;

a secondary transfer unit adapted to transfer, onto a printing medium, the color image formed on said intermediate transfer member;

a first detection unit adapted to be arranged at a first position and face said intermediate transfer member;

a second detection unit adapted to be arranged at a second position upstream of the first position in a conveyance direction of said intermediate transfer member and face said intermediate transfer member;

a determination unit adapted to determine whether a result of detecting, by said second detection unit, a first reference image formed on said intermediate transfer member is not larger than a predetermined value; and a control unit adapted to, when said determination unit determines that the result of detecting the first reference image is not larger than the predetermined value, control conveyance of the printing medium to said secondary transfer unit on the basis of the first reference image detected by said first detection unit, and when said determination unit determines that the result of detecting the first reference image is larger than the predetermined value, control conveyance of the printing medium to said secondary transfer unit on the basis of the first reference image detected by said second detection unit.

2. The apparatus according to claim 1, wherein said second detection unit comprises a plurality of second detection units arranged in a direction perpendicular to the conveyance direction of said intermediate transfer member.

3. The apparatus according to claim 1, wherein when a width of a detection signal of the first reference image is not larger than a set value, said determination unit determines that the detection signal of the first reference image is correct, and when the width of the detection signal of the first reference image is not smaller than the set value, determines that the detection signal of the first reference image is not correct.

4. The apparatus according to claim 1, further comprising a storage unit adapted to store a time difference between detection signals of a plurality of first reference marks respectively detected by a plurality of second detection units, wherein while sequentially updating a value immediately before said determination unit determines that at least one of the detection signals of the plurality of first reference marks is not correct, said control unit stores the value in said storage unit.

5. The apparatus according to claim 1, further comprising a storage unit adapted to store a time difference between detection signals of a plurality of first reference marks respectively detected by a plurality of second detection units, wherein said control unit stores, in said storage unit, an average of values obtained when said determination unit determines that all the detection signals of the plurality of first reference marks are correct.

6. The apparatus according to claim 1, wherein the image forming apparatus has a mode in which only the first reference image is formed on said intermediate transfer member when no image is formed, or a mode in which the first reference image and a second reference image are formed on said intermediate transfer member.

7. A method of controlling an image forming apparatus which transfers, onto an intermediate transfer member, a visible image formed on an image carrier and transfers, onto a printing medium, the image on the intermediate transfer member, the method comprising the steps of:

detecting a plurality of first reference marks which are formed in a direction perpendicular to a conveyance direction of the intermediate transfer member in order to determine a transfer position of the image on the printing medium;

allowing to detect a second reference mark which is formed downstream of positions where the first reference marks are formed on the intermediate transfer member, in order to detect a misregistration amount of the image transferred onto the intermediate transfer member, and also detecting the first reference marks;

determining whether detection signals of the first reference marks detected in the step of allowing to detect a second reference mark are not larger than a predetermined value; and when the detection signals of the first reference marks are determined in the determining step to be not larger than the predetermined value, controlling conveyance of the printing medium by using the detection signals of the first reference marks detected in the step of detecting a plurality of first reference marks, and when the detection signals of the first reference marks are determined to be larger than the predetermined value, controlling conveyance of the printing medium on the basis of positions of the first reference marks that are obtained by calculation.

* * * * *